Dec. 9, 1924.                                                              1,518,390
W. H. CATER
WELL AND METHOD OF SINKING
Filed June 23, 1923
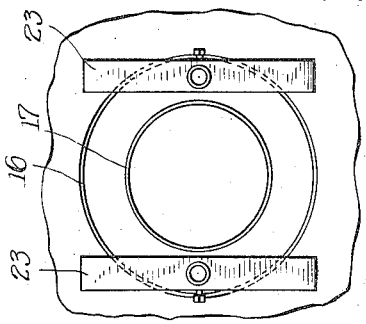
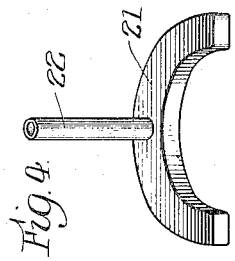
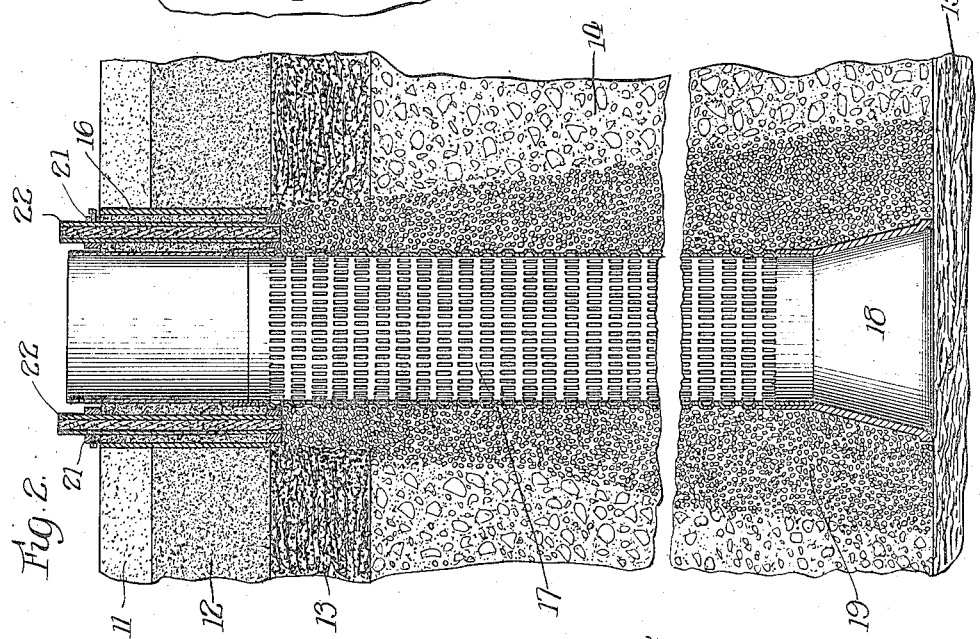
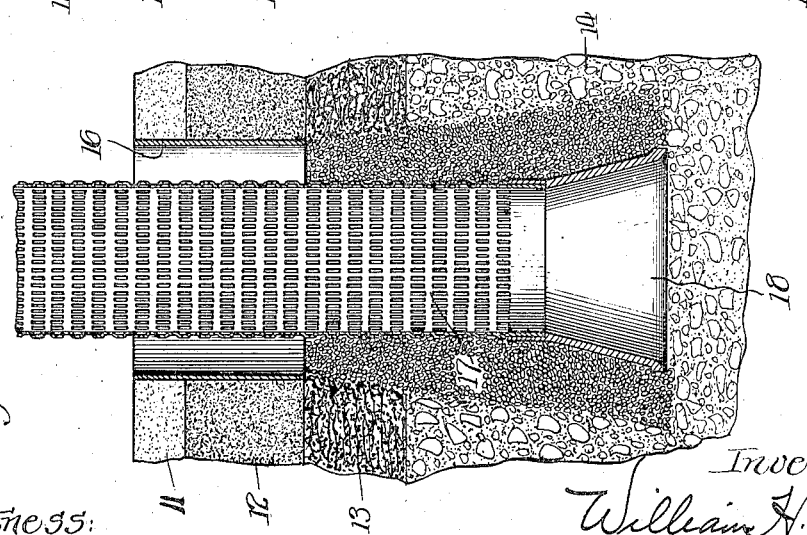

Patented Dec. 9, 1924.

1,518,390

UNITED STATES PATENT OFFICE.

WILLIAM H. CATER, OF CHICAGO, ILLINOIS.

WELL AND METHOD OF SINKING.

Application filed June 23, 1923. Serial No. 647,264.

*To all whom it may concern:*

Be it known that I, WILLIAM H. CATER, a citizen of the United States, residing at Chicago, in the county of Cook and State of Illinois, have invented certain new and useful Improvements in Wells and Methods of Sinking, of which the following is a specification.

My invention concerns novel means and methods for sinking wells and completing their production in such a way that their contents will be free from the possibility of contamination or pollution by the entrance or seepage thereinto of foul or impure surface water.

The invention aims to close or seal the well hole through the ground around the screen or casing to a depth sufficient to assure the maintenance of the well water in pure condition.

To this end, such passage or cavity in the ground is filled with a material, for example clay, to a depth down into or through a water impervious stratum in the ground, such, for example, as an underlying layer of clay.

Accordingly, the well-screen or apertured casing which lines the actual well passage is sunk or driven down in the usual or well-known manner, but through a cavity or recess in the ground near the surface and lined with a supplemental water-tight casing or shell surrounding the upper part only of the well-screen, such cavity and outer shell extending a limited distance down into the ground into or through such clay stratum.

During the later portion of the well-screen driving operation, clay or other suitable, practically water-tight, sealing-material is introduced into the space between the top part of the well-screen and the shell and is fed down gradually with the former, additional clay being inserted as required so that when the screen has reached its final position, a wall of such clay or other appropriate material will fill the cavity between the screen and shell and will extend downward from the surface of the earth into or through such clay layer or stratum.

The sinking or downward driving of the well-screen causes the removal of more or less of the fine material, such as sand, surrounding it, and this is progressively replaced by inserting gravel, stones, or other relatively coarse material, which forms substantial voids, thus tending to keep the perforations of the screen from becoming clogged.

The introduction of the clay or other sealing material into the cavity at the top would, unless especial means were provided, prevent the further or continued filling in of such surrounding gravel, but this clay seal or stopper or plug is desirably supplied with one or more upright pipes extended therethrough through which the coarse outer material may be fed down until no further quantity is needed whereupon these pipes or tubes are filled with concrete or other water-proof material whereby the well is effectively sealed or closed against the seepage thereinto of polluted or impure surface water.

In order that those skilled in this art may have a full and complete understanding of this invention both from its structural and functional effects, in the accompanying drawing forming a part of this specification and throughout the several views of which like reference characters refer to the same parts, I have illustrated a desirable and preferred embodiment of the invention, but it is to be understood that the latter is susceptible of a variety of embodiments differing more or less from that herein presented.

In this drawing:

Figure 1 is a vertical, sectional view showing the well partly completed and indicating the well-screen as only part way driven or sunk into the ground;

Figure 2 is a similar view illustrating the completed well;

Figure 3 is a top plan view of the finished well; and

Figure 4 is a perspective view of one only of a pair of clay retaining elements used in the driving of the well.

In the cross-section of the earth or ground as depicted in Figures 1 and 2, 11 is the top layer which may be of sandy loam for example, 12 is a stratum of clay, 13 is another form of different material, such as hard pan, 14 is a bed or layer of water bearing sand and gravel, and 15 may be bed rock.

Before the driving of the well proper begins, an outer, imperforate metal or other water-tight shell or casing 16, open at both ends is sunk in the ground a sufficient depth to extend through the water-impervious layer of clay 12, such cylindrical or angular wall constituting a lining for the corresponding cavity and forming a shield or barrier against any surface water obtaining entrance to the well shaft through the hole through the clay stratum and the top layer which is more or less porous and hence capable of permitting surface water to drain through it.

Then the well-screen 17, apertured or perforated as shown, and its lower foot or shoe 18 is sunk or forced down in the usual way by means of the employment of the customary pump (not shown) within the screen, the latter by reason of suitable pressure or weight applied thereto descending gradually step by step in a well-known manner.

Such sinking or driving of the well causes the removal of more or less of the fine material, such as sand, surrounding the perforated or apertured screen by the action of the water, and to fill up such annular space gravel or the like coarse material 19 with substantial voids is fed thereto through the circular aperture or hole between the screen and the enclosing or surrounding shell.

When the screen has thus been sunk to a depth so that its further descent will equal approximately the combined thicknesses of the two strata 11 and 12, then two, substantially semi-circular retainers or closures 21, 21 are fitted around and on opposite sides of the screen and caused to descend with it, the annular space above them being filled progressively with clay or similar practically water-tight material.

As these members move down with the screen clay or the equivalent material is added so that by the time they reach the bottom of the clay stratum 12, the whole casing 16 around the screen will be filled with such sealing material.

It is necessary or desirable to continue feeding or admitting gravel or stones to the space around the screen below the clay layer after the members 21 have been inserted, and, to this end, each such member is equipped with a vertical pipe or upright conduit 22 extended therethrough and up to or above the top of the ground, and through these as occasion requires, the gravel is introduced to the cavity below to compensate for the removal of the finer material.

When the curved parts or members 21, 21 have completed their descent to their final or ultimate positions indicated in Figure 2, they are anchored against further downward movement by bars or retainers 23 clamped to their upper ends and of sufficient or adequate length to rest on the surface of the ground surrounding the well as shown in Figure 3.

After the last charges of such gravel or other coarse material have been introduced into or through the upright pipes or conduits 22, the latter are filled or sealed with concrete or equivalent material to assure that no contamination or pollution can occur such as by the descent through them of foul or unclean surface water, which if permitted would find access to the water in the well-screen through its perforations or slots.

The undesirable or dangerous surface water cannot find access to the underlying strata in the earth through the clay layer 12 which prevents passage of water through it.

Also due to the presence of the shell 16 it cannot enter the larger aperture at one time forming the top of the well, and it cannot pass down between the inner surface of such outer shell or wall and the upper imperforate portion of the well-screen, because this space is effectively closed or sealed or plugged by the clay stopper or closure between them and the concrete filled pipes.

Thus the improved well results in assurance that its water will be derived solely from the stratum or strata below the clay layer and this is certain to be free from contamination or defilement by reason of objectionable or dangerous surface water finding access or seepage into the screen.

It is to be understood that this invention is susceptible of many changes or modifications over those features presented herein in detail and many changes may be made in the embodiment, without departure from the heart and essence of the invention and without the sacrifice of any of its substantial benefits and advantages.

I claim:

1. The method of sinking a well consisting in removing the earth to a depth through a stratum of clay, lining the upright walls of such cavity with a water-proof shell, sinking a well-screen through such cavity inside of said shell, inserting clay between said shell and screen leaving a passage therethrough and causing such inserted clay to descend with the screen, feeding coarse material through the passage below the inserted material, and finally sealing said passage with water-tight material.

2. The method of sinking a well consisting in removing the earth to a depth at least into a stratum substantially impervious to the seepage of water therethrough, lining the upright walls of such cavity with a water-proof shell, sinking a well-screen through such cavity inside of said shell, inserting a material practically impermeable to water between said shell and screen leaving a passage therethrough and causing such inserted material to descend with the screen, feeding coarse material through the passage of said inserted material below the latter, and finally sealing said passage with water-tight material.

3. The method of sinking a well consisting in removing the earth downwardly from the surface to a depth at least into a stratum substantially impervious to the seepage of water therethrough, lining the upright walls of such cavity with a water-proof shell, sinking a well-screen through such cavity inside of said shell, progressively introducing coarse material around the outside of said well-screen through the annular space between said lining and well-screen, during the latter portion of the sinking of said well-screen inserting a material practically impermeable to water between said lining and said well-screen leaving a passage therethrough, such material descending with said well-screen, completing the insertion of said coarse material through said passage, and finally sealing said passage with a water-tight material.

4. The method of sinking a well consisting in removing the earth to a depth at least into a stratum substantially impervious to the seepage of water therethrough, lining the upright walls of such cavity with a water-proof shell, sinking a well-screen progressively through such cavity inside of said shell, and progressively filling the space in said cavity between said outer shell and said well-screen during the latter portion of the well-screen sinking operation with a sealing material practically impermeable to water, the descent of the screen causing the downward travel of such sealing material.

5. The method of sinking a well consisting in removing the earth downwardly from the surface to a depth at least into a stratum substantially impervious to the seepage of water therethrough, sinking a well-screen progressively through such cavity, and progressively filling the space in said cavity around said well-screen during the latter portion of the well-screen sinking operation with a sealing material practically impermeable to water, the descent of the screen causing the downward travel of such sealing material.

6. A well comprising in combination, a perforated well-screen sunk in the earth, an outer shell sunk in the earth from the surface of the latter to a depth at least into a stratum substantially impervious to the percolation of water therethrough, a practically water-tight sealing means between the upper part of said screen and said shell, a sealed upright passage through said sealing-means, and introduced coarse material surrounding said screen below said sealing means, whereby the entrance of polluted surface water into the well-screen is prevented.

In witness whereof I have hereunto set my hand and seal.

WILLIAM H. CATER. [L. S.]